(12) United States Patent
Schuit et al.

(10) Patent No.: US 9,160,273 B2
(45) Date of Patent: Oct. 13, 2015

(54) UNIVERSAL END CLAMP

(75) Inventors: Nathan Schuit, Edgewood, NM (US);
Jason Mayfield, Albuquerque, NM (US); Jon Roensch, Albuquerque, NM (US); Juan Suarez, Albuquerque, NM (US); Todd Ganshaw, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 833 days.

(21) Appl. No.: 13/179,278

(22) Filed: Jul. 8, 2011

(65) Prior Publication Data

US 2013/0011187 A1 Jan. 10, 2013

(51) Int. Cl.
| F16B 2/00 | (2006.01) |
| H02S 40/34 | (2014.01) |
| F16B 2/06 | (2006.01) |
| H01R 4/26 | (2006.01) |
| H01R 4/38 | (2006.01) |
| H01L 31/042 | (2014.01) |
| F16B 7/04 | (2006.01) |
| F24J 2/52 | (2006.01) |

(52) U.S. Cl.
CPC .............. *H02S 40/34* (2014.12); *F16B 2/065* (2013.01); *F24J 2/5258* (2013.01); *H01R 4/26* (2013.01); *H01R 4/38* (2013.01); *H02S 20/00* (2013.01); *F16B 7/0493* (2013.01); *F24J 2/5205* (2013.01); *F24J 2002/5215* (2013.01); *F24J 2002/5218* (2013.01); *F24J 2002/5226* (2013.01); *F24J 2002/5281* (2013.01); *Y02E 10/47* (2013.01); *Y10T 403/51* (2015.01)

(58) Field of Classification Search
USPC .......... 403/110, 256, 338, 373, 387; 269/143, 269/249, 3, 6, 95; 29/257; 248/229.1, 248/229.12, 229.11, 229.14, 228.1, 228.2, 248/228.3, 228.5, 230.9, 231.41, 231.61, 248/231.85

See application file for complete search history.

(56) References Cited

U.S. PATENT DOCUMENTS

| 5,592,981 | A | * | 1/1997 | Derecktor ................. 144/286.1 |
| 5,836,365 | A | * | 11/1998 | Derecktor ..................... 144/287 |
| 6,547,482 | B2 | * | 4/2003 | Schworer ...................... 403/386 |
| 7,770,859 | B2 | * | 8/2010 | Costabel et al. ............ 248/316.5 |
| 2005/0045785 | A1 | * | 3/2005 | Cohen ........................... 248/214 |
| 2007/0084504 | A1 | * | 4/2007 | Kobayashi et al. ........... 136/251 |
| 2008/0010915 | A1 | * | 1/2008 | Liebendorfer ............... 52/173.3 |
| 2008/0302928 | A1 | * | 12/2008 | Haddock .................... 248/205.1 |

(Continued)

FOREIGN PATENT DOCUMENTS

| DE | 10 2004 044 103 A1 | 4/2005 |
| DE | 20 2009 011 708 U1 | 4/2010 |
| EP | 2 146 160 A1 | 1/2010 |
| FR | 2 950 375 A1 | 3/2011 |
| WO | WO 2008/021714 A2 | 2/2008 |
| WO | WO 2010126770 A1 * | 11/2010 |

OTHER PUBLICATIONS

Extended European Search Report dated May 18, 2015 (Four (4) pages).

*Primary Examiner* — Victor MacArthur
(74) *Attorney, Agent, or Firm* — Crowell & Moring LLP

(57) ABSTRACT

Universal End and Mid Clamps are used to connect 2 things together and are designed so that when the clamp fastener is properly tightened the piece being clamped will resist loads in 3 directions and will resist sliding.

11 Claims, 9 Drawing Sheets

(56) References Cited

U.S. PATENT DOCUMENTS

| | | |
|---|---|---|
| 2009/0166494 A1* | 7/2009 | Bartelt-Muszynski et al. ............................ 248/237 |
| 2009/0232616 A1* | 9/2009 | Sekreta et al. ................ 411/107 |
| 2010/0269447 A1* | 10/2010 | Schuit et al. .................... 52/698 |
| 2010/0275549 A1* | 11/2010 | Bruce et al. ..................... 52/698 |
| 2010/0276558 A1* | 11/2010 | Faust et al. ............... 248/222.14 |
| 2011/0085875 A1 | 4/2011 | Aftanas |

* cited by examiner

UNIVERSAL END CLAMP

FIELD OF THE DISCLOSURE

The present disclosure pertains generally to an apparatus and method for removably and adjustably mounting a device on a surface. More particularly, the new and useful embodiment described in this document pertains to a universal clamp assembly for securely clamping one or more photovoltaic modules, panels and arrays to a footing, footing grid, roof, pole, or any other surface, implement or object (collectively, "object" or "objects"). The present disclosure provides several advantages. These include providing a top-mounting clamp that can be placed anywhere on a rail, integrated bonding to enable installation with fewer parts needed, enhanced reliability and strength, a lockable cam-on feature that prevents the clamp from becoming displaced from the rail once installed, a clamp that resists rotation in all directions, ease of installation, and a device that can be used as both a mid-clamp and an end-clamp.

BACKGROUND

Mounting devices to objects that are, or may be, exposed to unpredictable and varying force vectors caused by wind, rain, and other elements of weather present technical problems often difficult to solve. A long standing and unsolved challenge in the solar energy industry, for example, has been resolving how best to mount panels, modules and arrays of photovoltaic devices (collectively, "module" or "modules") on surfaces not only securely and safely, but also quickly. The obverse problem also is significant to the industry, namely safely removing or reconfiguring a module that has been installed on a surface.

Solar energy radiation from the sun is capable of producing heat, causing chemical reactions, or generating electricity. The sun is an extremely powerful energy source, and solar radiation is by far the largest source of energy received by Earth, but its intensity at the Earth's surface is comparatively low. This is partly because Earth's atmosphere and its clouds absorb or scatter as much as 54 percent of all incoming sunlight. Solar energy, however, due to technological improvements in the manner of collecting the potential energy, has become increasingly attractive as an energy source: it is inexhaustible in supply, and non-polluting, both in stark contrast to fossil-fuel sources like coal, oil, and natural gas.

Sunlight reaching earth consists of approximately 50 percent visible light, 45 percent infrared radiation, and small amounts of ultraviolet light and other forms of electromagnetic radiation. Radiation is convertible either into thermal energy or directly into electricity by photovoltaic cells. In photovoltaic cells, a small electrical voltage is generated when light strikes the junction between a metal and a semiconductor or a junction between two different semiconductors. Although the voltage generated from a single photovoltaic cell typically is only a fraction of a volt, by connecting large numbers of cells together into panels, modules and arrays, significant electric power can be generated. To harness radiation for direct generation of electricity using cells collected into panels, modules and arrays, a number of apparatus and methods for using and installing the apparatus have been devised on which to mount modules on surfaces exposed to the radiation. The construction, installation, and use of such apparatus present a number of unsolved problems.

A wide variety of clamp assemblies, racks, frames and associated hardware have been proposed to mount modules on objects. Some solutions have proposed modifications of the shape, structure and size of components of a module to achieve more rapid and secure mounting. Other solutions have proposed altering the construct and design of hardware associated with installing racks, framing, and footings into a footing grid on which modules are mounted. As used in this document the term "footing grid" includes at least a network of keepers often, but not exclusively, L-shaped and formed with at least one hole in each extension of the "L." The keepers are connectable to a surface and are formed and shaped to permit attachment of other hardware components such as rails and frames on which modules may be attached.

Prior approaches suggested for mounting a module on an object include significant limitations and problems. A serious challenge to providing a useful apparatus and method for mounting a module on a surface arises from the variety of sizes and shapes of the modules, as well as the varying number of modules that might be required in a given situation. Another challenge that earlier suggestions did not overcome is the variety of surfaces on which modules may or must be mounted, including roofs, tops and sides of poles, the ground, and other locations. Earlier solutions, therefore, required construction of custom built racks to fit each of the enumerable iterations of the sizes and shapes of modules.

Many earlier suggestions for mounting panels, modules and arrays of photovoltaic devices on surfaces are cumbersome, unsafe, and not easily assembled or reconfigured. In the industry associated with clamps for installation of photovoltaic modules, the term "top down" refers to attaching a module to a rail on a frame using a clamp that secures to the uppermost portion of the module. For example, in the case of a module to be mounted on a building, one or more rails first would be attached to a footing grid that earlier has been attached to the surface, in this instance the roof; thereafter, one or more modules would be attached to the rails. Hardware that secures the module to the rails is attached from the top, or front, of the module. The term "bottom up" refers to positioning a photovoltaic module by first attaching the module to the footing grid and to the roof or other surface. In bottom up mounting, hardware used to secure the module to the rail is attached from the bottom or back of the module. The uniqueness of each installation, an installer's preferences, and the particular module all will determine whether a top down or bottom up installation is used. The embodiments described in the present disclosure refer to the top-down configuration.

Another limitation of current approaches for mounting photovoltaic modules to a surface is the excessive number and variety of hardware parts and components that are required for each clamp assembly. Each module or combination of modules installed may present different shapes, sizes and configurations, thus requiring a unique combination of mounting hardware.

Yet another limitation of current approaches for mounting modules to a surface is the location where clamps for securing the modules to the rails may be placed. Several current approaches require the clamp to be placed in a specific location to secure to the rail and in turn secure the module to the clamp. There is a need for a clamp that may be placed anywhere along a rail to securely clamp a module to a rail.

Still another limitation of current approaches is that in addition to securely clamping modules to rails, there must be a means for efficiently providing an electrical ground route in the case of a fault. Modules contain electric current that flows between the modules and to a storage module. In the case of a fault during installation, there is a need for a ground route between the modules so that current is safely diverted to ground. Prior art configurations require a separate infrastructure to for grounding the modules that can malfunction or otherwise be rendered inoperable. There is a need for a clamp that provides integrated bonding between modules to provide a ground route without the need for additional infrastructure.

Another limitation of current approaches to clamping modules to supports such as rail systems, is the use of a bolt that serves as both a fastener and a slider. According the current approaches, a bolt is inserted into a slot in a rail and is oriented such that the head of the bolt is within the slot and a clamp is placed over at least a portion of the panel and the bolt so that the bolt extends through the clamp. Unpredictable and varying force vectors caused by wind, rain, and other elements of weather as well as errors in installation may cause these clamp assemblies to disengage from the support system, causing a module to come loose and interrupt the electrical current between the modules or potentially fall off the support system.

Still another unresolved problem arises from the varying shapes, sizes and configurations of modules. The arrangement of the modules on a surface such as a roof may not be dimensionally consistent with the location of rafters underneath the roof into which hardware must be inserted to hold the footing grid and rails. Clamps for securing varying sized modules to rails are currently available in various sizes. These sized clamps require an installer to carry multiple clamps of varying sizes and fit each clamp before to ensure a proper fit. Additionally, there may be some modules for which none of the clamp sizes securely clamp the module to the rail. This could lead to a loose connection or loss of connection to the rail.

Therefore, a previously unaddressed need exists in the industry for a new and useful clamp assembly for positioning a device such as a photovoltaic panel, modules and arrays of photovoltaic devices on a surface such as a roof, pole or other surface. Particularly, there is a significant need for a method and apparatus for mounting one or more photovoltaic modules safely, reliably, yet quickly on a surface; removing or reconfiguring the modules just as safely, reliably and quickly; and providing a clamp assembly that is adjustable and expandable to allow a variety of dimensions and configurations. Additionally, there is a need for a new and useful clamp that will secure a module to a support and resist loads in all three directions while providing integrated bonding between the modules.

GENERAL SUMMARY

Given the conventional solutions for solving the problems associated with removably and adjustably clamping a device such as a module having any of size and shape on a wide variety of surfaces; of reducing the number and variety of different hardware components that installers must use to install modules; and of providing a clamp that will resist loads in three directions, it would be desirable, and of considerable advantage, to provide a clamp assembly for quickly and safely mounting a module on a surface that overcomes those problems.

The present disclosure provides numerous advantages in connection with mounting, attaching, adjusting the configuration of one or more modules, and removing the one or more modules from a surface in a safe, reliable, yet rapid manner. At least one of the advantages of the present disclosure is that it provides a top-mounting clamp assembly that may be installed anywhere on a rail. The present disclosure also significantly reduces the number and variety of hardware parts and components needed to install the apparatus. The clamps of the present disclosure, also permit ready slidable adjusting and readjusting of the location on a rail on which the module may be positioned. Equally significant, the present disclosure provides an apparatus and method for removably and adjustably mounting a device such as a module on a surface which respectively are easy to use and to practice, and which are cost effective for their intended purposes. The clamp assembly of the present disclosure also ensures secure placement of a module by providing resistance loads in three directions.

Another advantage of the clamp assembly described in present disclosure is that it provides integrated bonding to enable a ground route between modules without the need of additional materials. A further advantage of the present disclosure is a clamp assembly with a lockable cam-on feature that prevents the clamp from becoming displaced from the rail once installed.

Another advantage of the clamp assembly described in the present disclosure is that it may be used as both a mid-clamp and as a universal end-clamp. A mid-clamp is a clamp that is secured between two modules on a support. An end-clamp is a clamp that is secured to a module on only one end. Unlike end-clamps of the prior art, which must be specifically sized to fit to each module, the clamp of the present disclosure is universal in that it is adjustable in height to accommodate different module sizes and shapes. In addition to providing a clamp that may be used as a mid-clamp and an end-clamp, the clamp of the present disclosure provides twice the clamping force of the prior art end-clamp. Unlike prior art end-clamps where half of the clamping force is directed into the support, and half of the clamping force is directed into the module, in clamp of the present disclosure, all of the clamping force is directed into the module.

These and other advantages are achieved in the present disclosure by providing a clamp assembly for mounting and securing a device on a surface that includes a clamp with a plate portion and fangs extending from the plate portion, a slider with an upper portion and a lower portion, and a fastener. The term "slider" as used in this document includes any number of means for securing a clamp assembly to a support such as a rail that wraps around a support system and engages with the underside of flanges on the support system. The term "fastener" as used in this document includes any number of means for fastening, including without limitation a bolt, screw, clamp, dowel, rivet, and other means for fastening through a bore. The term "clamp" as used in this document refers to any number of means for securing a device to a support.

The slider includes a channel extending the length of the slider and sized to receive the flanges of a support member such as an I-beam. The unique slider configuration helps achieve the advantages of the present disclosure by providing a slider with at least one portion that wraps around at least one flange of the rail and cannot be removed unless the clamp assembly is removed. Unlike prior art sliders that include a bolt that fits into a slot on a rail and that may disengage with the rail if the bolt is rotated about the z-axis, the slider of the present disclosure wraps around the flanges of a rail and will not disengage with a rail upon rotation about the z-axis. A fastener extends through both the plate of the clamp and the upper portion of the slider to secure the clamp assembly to a module and a rail. In an operative configuration, a module is placed on a support such as a rail. The clamp assembly clamps the module to the rail by first inserting the slider on the rail adjacent the module by placing at least one leg portion of the lower portion of the slider around at least one flange of the rail. The fastener extends upwardly away from the slider. The fastener is inserted through the clamp, which is placed on the module. The clamp assembly is secured by securing the fastener within the clamp and the slider.

The unique clamp configuration includes fangs, which provide integrated bonding between modules and allow electricity to flow between the modules without the need for additional materials to provide flow of electricity between modules. As the fastener is tightened, the fangs will pierce a non-conductive coating such as annodization on a module and become embedded into the conductive base substrate, such as aluminum, allowing electrical current to flow through the modules.

To add to the universality of the clamp of the present disclosure, the slider may include slots in the upper portion for receiving arms extending downward from the clamp. In this configuration, the clamp includes at least one arm extending downward from the plate. The arms insert into slots extending longitudinally along the upper portion of the slider. As the fastener is tightened arms extend further into the slots. In this configuration, the clamp may be used as a universal end clamp. By securing the clamp to the slider by way of the arms and the slots, the clamp assembly can secure a single module without the need for applying clamping force to the rail. In this way, the universal clamp may be adjusted to fit the height of various modules, and can deliver twice the clamping force of clamp assemblies of the prior art.

The clamp described in the present disclosure also allows assembly of photovoltaic modules of many sizes or configurations, on a variety of surfaces. The unique clamp assembly of the present disclosure permits rapid installation as well as rapid adjustments and relocation of a module. Equally significant, the clamp assembly of the present disclosure is easy to use and to practice, and is cost effective for the intended purposes.

The advantages, objects, and features of the present disclosure will become apparent to those skilled in the art when read in conjunction with the accompanying following description, drawing figures, and appended claims. It is clear, however, from the foregoing that the claimed subject matter as a whole, including the structure of the apparatus, and the cooperation of the parts of the apparatus, as well as the method for installing and using the apparatus, combine to result in a number of unexpected advantages and utilities of the present disclosure.

The foregoing has outlined broadly the more important features of the disclosure to better understand the detailed description which follows, and to better understand the contribution of the present disclosure to the art. Before explaining at least one embodiment in detail, it is to be understood that the disclosure is not limited in application to the details of construction, and to the arrangements of the components, provided in the following description or drawing figures. The clamp assembly of the present disclosure is capable of other embodiments, and of being practiced and carried out in various ways. Also, the phraseology and terminology employed in this disclosure are for purpose of description, and should not be regarded as limiting.

As used in this document, the term "device" is not limited to the photovoltaic environment. For example, but not by way of limitation, the term includes any device capable of generating power, but may also be a device capable of holding liquids, gases or admixtures of solids. A device may be mounted on a surface which may include the roof or wall of a building, a pole, or any other surface. The shape of the device is not material to the present disclosure, and may be rectangular, circular, or any other shape or configuration.

As those skilled in the art will appreciate, the conception on which this disclosure is based readily may be used as a basis for designing other structures, methods, and systems for carrying out the purposes of the present disclosure. The claims, therefore, include such equivalent constructions to the extent the equivalent constructions do not depart from the spirit and scope of the present disclosure. Further, the abstract associated with this disclosure is neither intended to define the extent of the embodiments, which are measured by the claims, nor intended to be limiting as to the scope of the disclosure in any way.

The novel features of this disclosure, and the embodiments themselves, both as to structure and operation, are best understood from the accompanying drawing, considered in connection with the accompanying description of the drawing, in which similar reference characters refer to similar parts.

DESCRIPTION OF THE PREFERRED EMBODIMENTS

Figure 1:
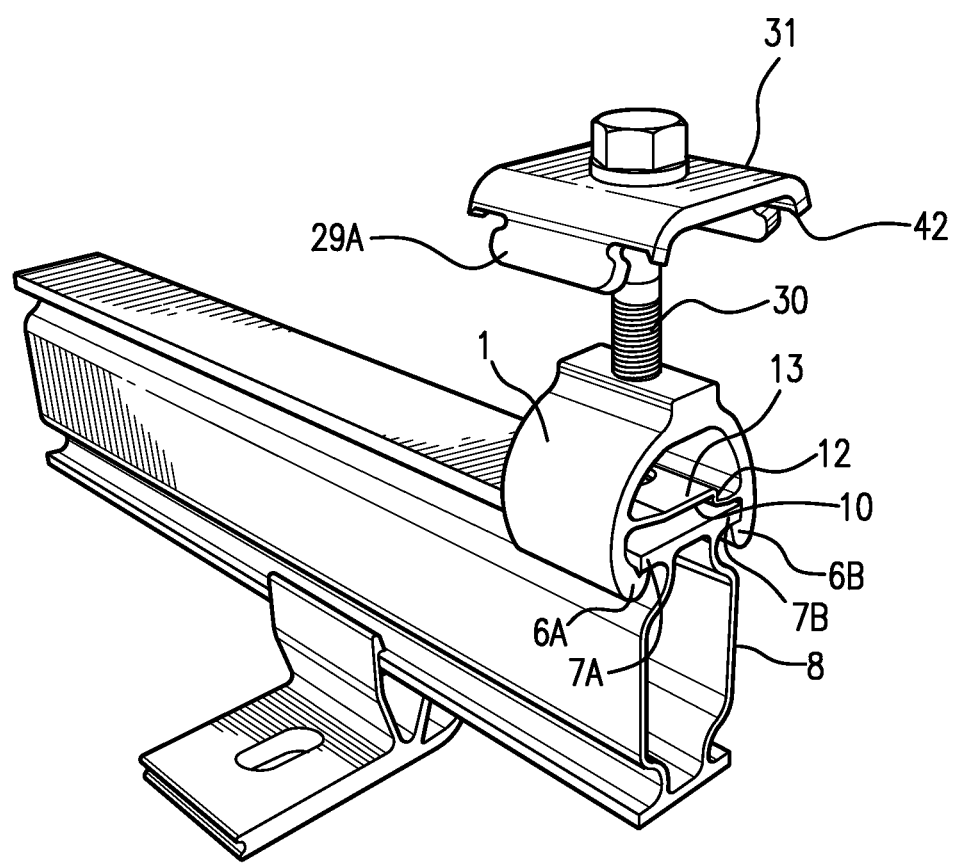
FIG. 1 is a diagram of a preferred embodiment of the clamp assembly mounted on a support member.

Briefly, the present disclosure provides a universal clamp assembly for removably and adjustably mounting a device on a surface. Referring to FIG. 1, each clamp assembly is composed of three main components: (1) a slider 1, (2) a fastener 30 and (3) a clamp 31. In general, the slider 1 engages with flanges 7A and 7B of a support member 8, at any location along the support member 8. The fastener 30 threads through the slider 1 and is inserted through the clamp 310 to complete the clamp assembly.

The slider 1 is designed to engage a flanged portion 7A and 7B of a support member 8. Sliders 1 self center on the support member. The slider 1 may be made of any suitable material, including but not limited to aluminum, steel, or polymers reinforced with fiber.

Figure 2:
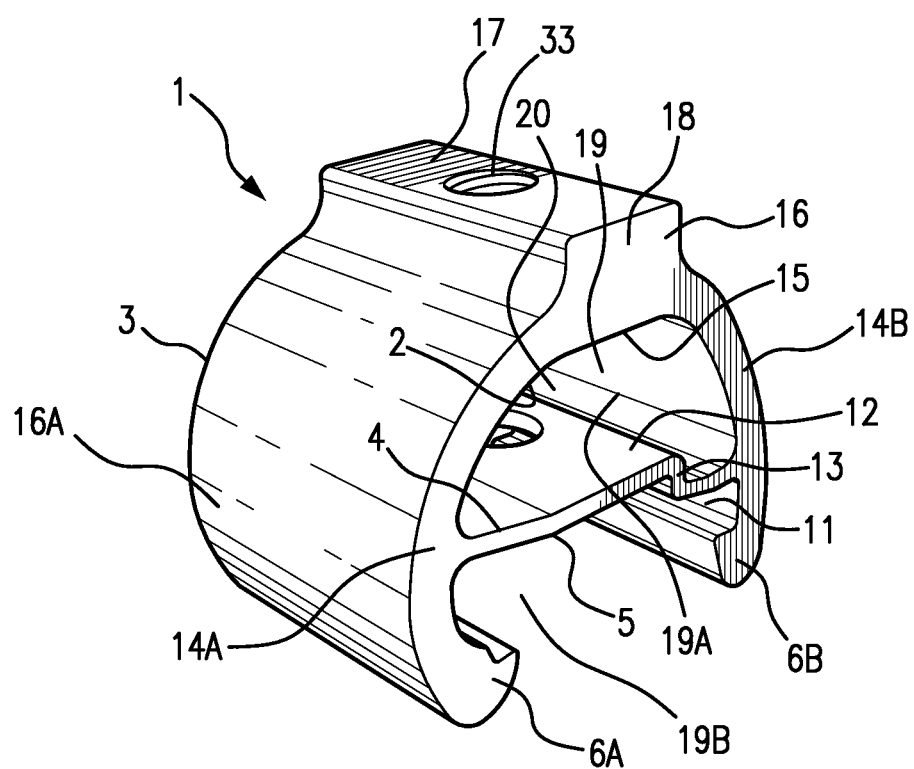
FIG. 2 is a diagram of a slider of the preferred embodiment.
Figure 12:
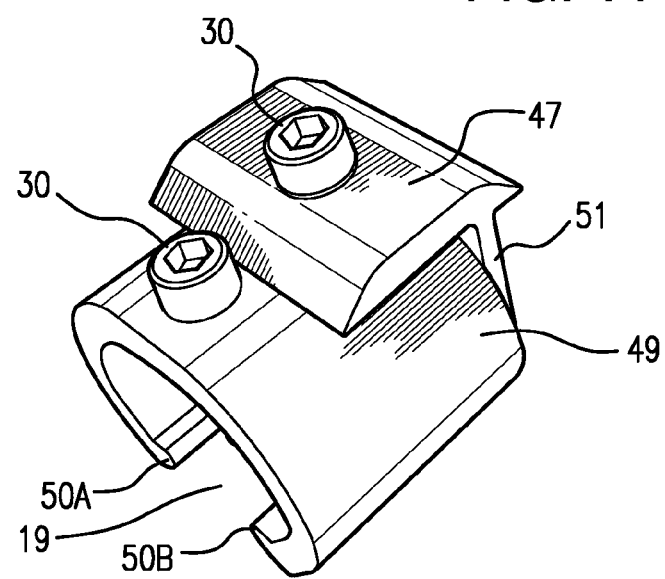

Referring to FIG. 2 a preferred embodiment, the slider 1 includes an upper portion 16 and a lower portion 16A. The upper portion 16 has a top surface 17 and a bottom surface 15 and at least one hole 33 extending through the upper portion 16 from the top surface 17 through the bottom surface 15 into a cavity to accept a fastener 30. Referring to FIG. 12, in some embodiments there may be at least two holes extending through the upper portion. Referring to FIGS. 2-5, the lower portion 16A defines at least two leg portions 14A and 14B designed to wrap around and securely engage a flange 7A and 7B of a support member 8 and cam or snap onto the flange 7A and 7B when the clamp is engaging a module and fastener is tightened.

Referring to FIGS. 2-6, in one embodiment, the slider 1 generally extends along a longitudinal x-axis and a transverse y-axis. The slider 1 comprises an upper portion 16, and at least two leg portions 14A and 14B defining an open ended cavity 19, 19A, 19B along the longitudinal axis of the slider 1 and designed to receive at least one flange 7A or 7B of a support member 8. The slider 1 extends longitudinally a sufficient length prevent the slider 1 from rotating about the y- and z-axes, for example, about 0.25 to about 3.0 inches. In one embodiment, the slider 1 is generally C-shaped along the transverse axis, the legs 14A and 14B extending from the upper portion 16 in a downward direction, and designed to engage at least one flange 7A or 7B of a support member 8. The upper portion 16 defines a top surface 17 and a bottom surface 15 and includes a threaded hole 33 extending from the top surface 17 through the bottom surface 15, to accept a fastener 30. The upper portion 16 further includes a central section 18 extending longitudinally along the slider 1. The central section 18 may have a thickness thicker than the remainder of the upper portion 16 and the legs 14A and 14B to provide increased support for the fastener 30. Each leg 14A and 14B defines an outer surface 3 and an inner surface 2, wherein the inner surfaces 2 of the legs along with bottom surface 15 of the upper portion 16 define the cavity 19. The inner surface 2 of each leg includes a notch 6A and 6B near the bottom end of the leg 14A or 14B, extending inwardly into the cavity 19 to engage the underside of a flange 7A and 7B of support member 8 and thereby secure the slider 1 to the support member 8.

Figure 6:
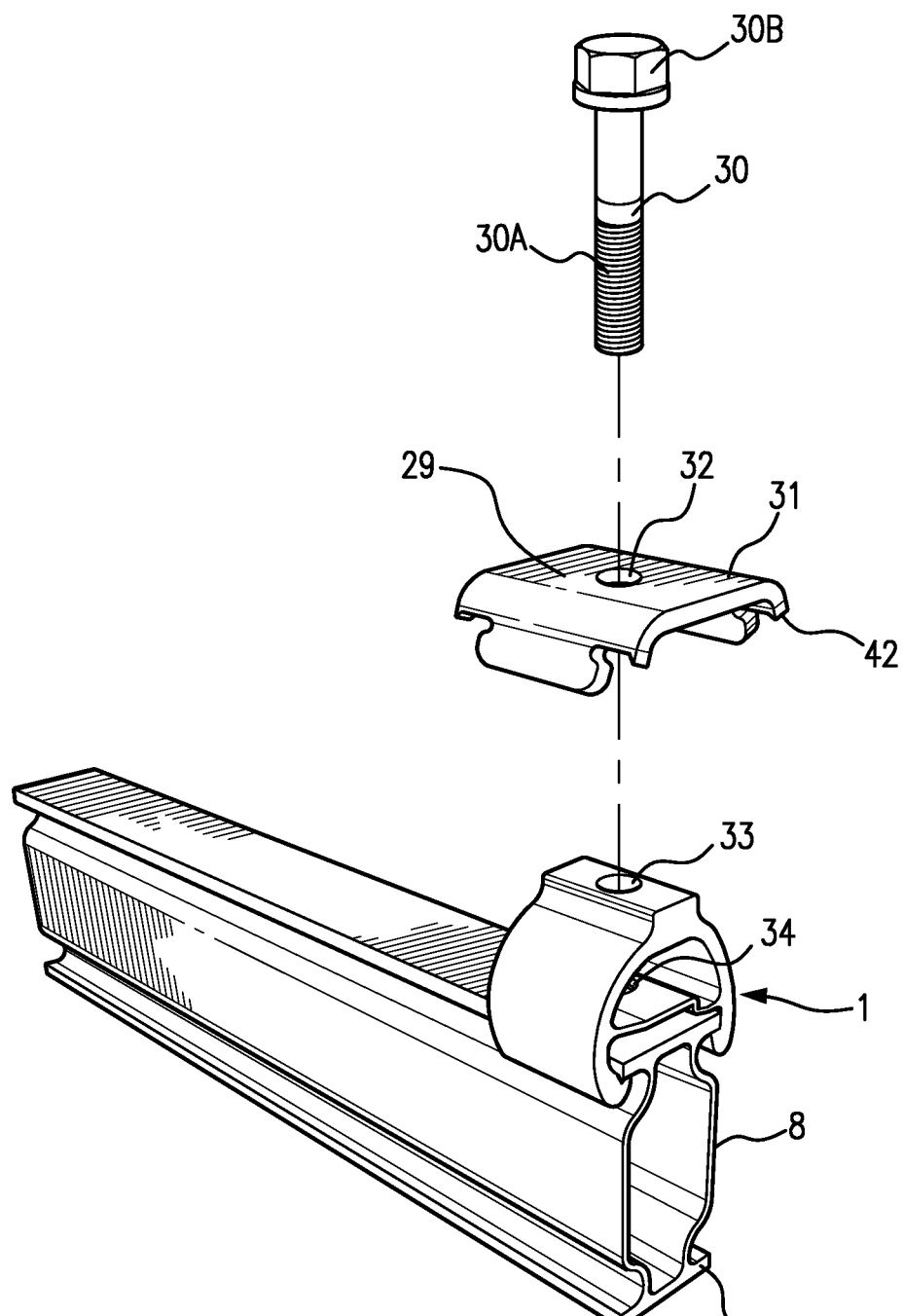
FIG. 6 is an exploded view of the clamp assembly of a preferred embodiment.

Referring to FIGS. 2-6, in one embodiment, the cavity 19 is divided into at least two sub-cavities, 19A and 19B. In this embodiment, the slider 1 includes a web portion 12 extending transversely through the cavity 19 from a first leg 14A to a second leg 14B as well as longitudinally along the length of the slider 1. The web portion 12 has a height less than the height of the slider 1 and includes a top surface 4 and a bottom surface 5, the top surface 4 of the web portion generally facing the bottom surface 15 of the upper portion 16. The web portion along 12 with the upper portion 16 and legs 14A and 14B define an upper sub-cavity 19A and a lower sub-cavity 19B. The upper sub-cavity 19A is defined by the bottom surface 15 of the upper portion 16, the inner surfaces 2A and 2B of the two legs 14A and 14B and the top surface 5 of the web portion 12. The lower sub-cavity 19B is defined by the bottom surface 5 of the web portion 12 and the inner surfaces 2A and 2B of the legs including the inward facing notches 6A and 6B. In this embodiment, the upper sub-cavity 19A is designed to receive a fastener 30 and the lower sub-cavity 19B is designed to receive a flange 7A and 7B of a support member 8. The web portion 12 may include a hole 34 extending through the top surface and bottom surface and aligned with the hole extending through the upper portion to receive a fastener as illustrated in FIG. 6.

Figure 3:
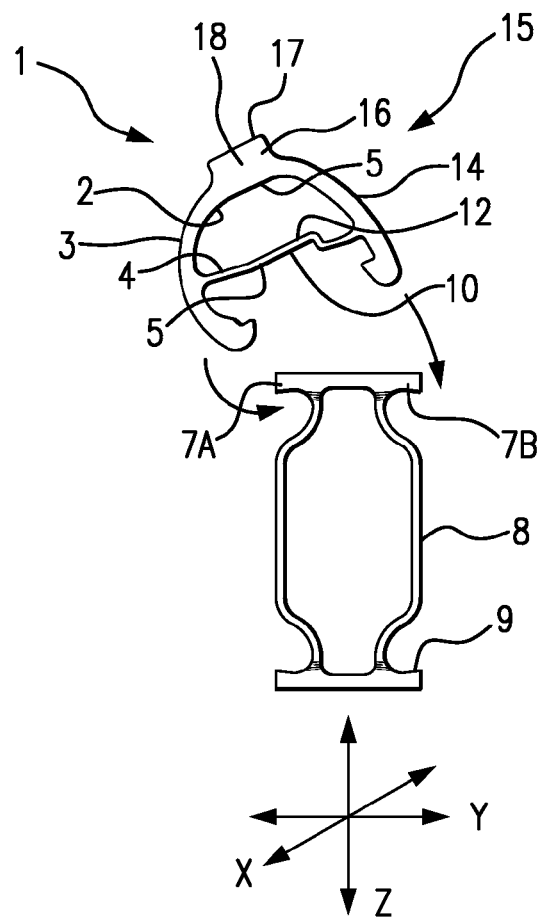
FIGS. 3-5 depict the process of camming the slider of a preferred embodiment onto a support member.
Figures 4, 5:
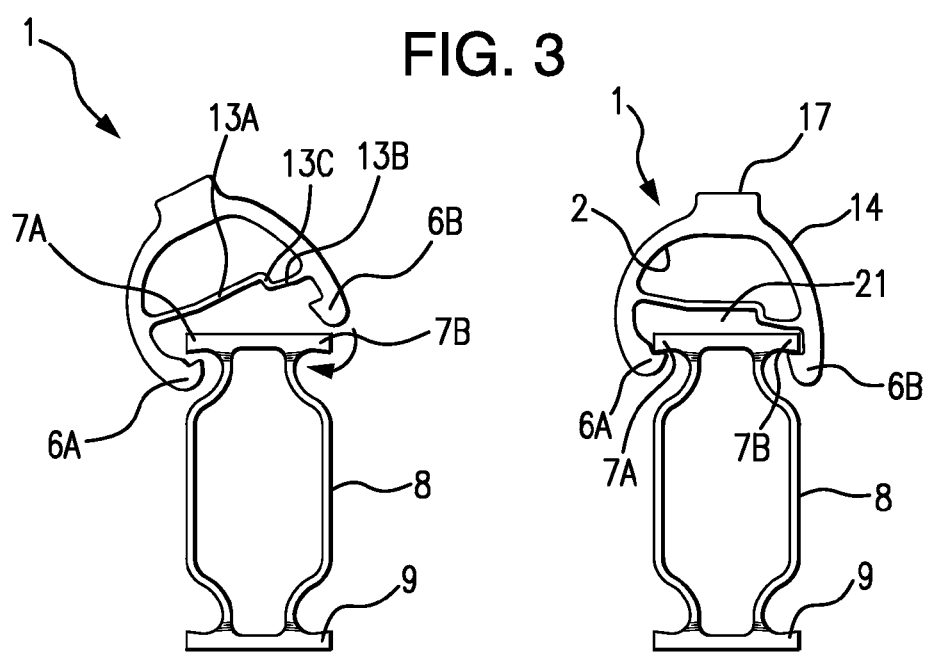
Figure 7:
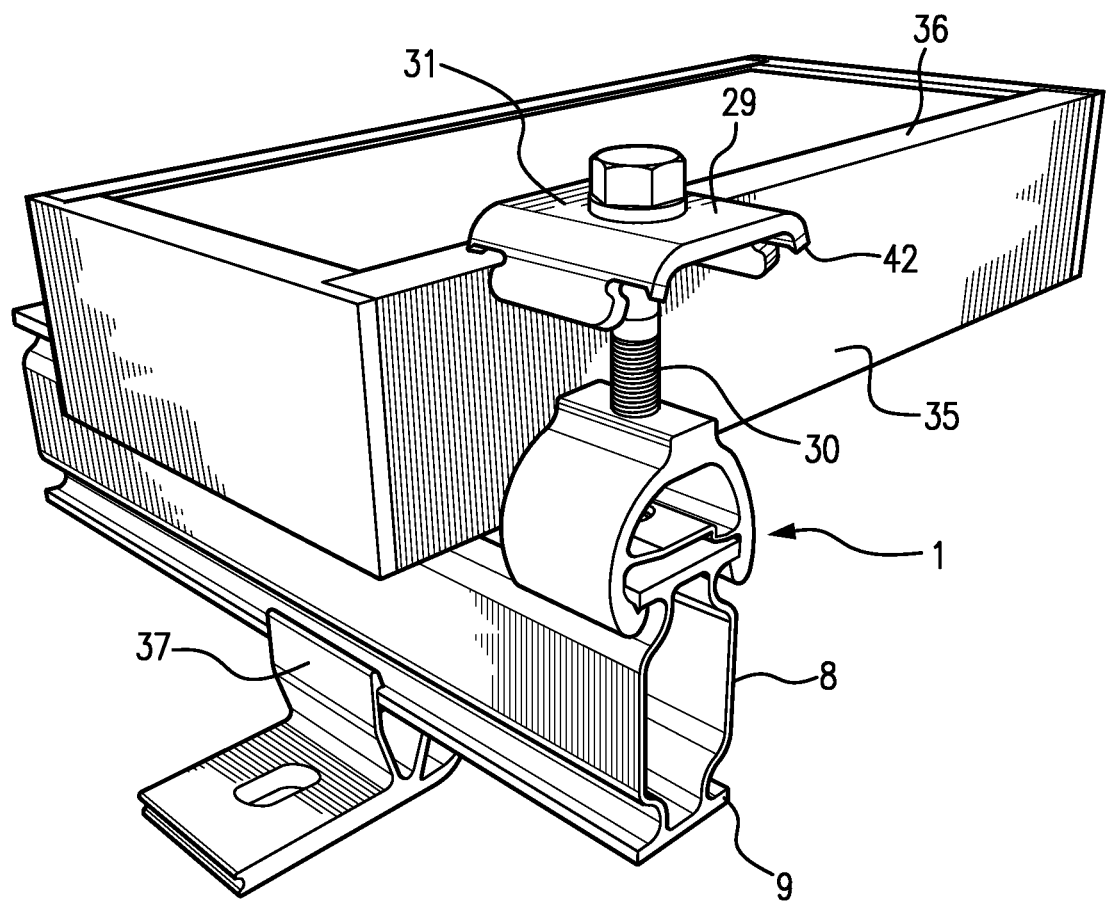
FIG. 7 is a diagram of the embodiment of FIG. 1 securing a module mounted on a support member.

Referring to FIGS. 3-5, the slider 1 legs 14A and 14B are designed to allow the slider 1 to cam on to the support member 8. In this embodiment, the web portion 12 comprises at least three sub-surfaces 13A, 13 B and 13C. The first sub-surface 13A extends from the inner surface of the first leg 14A at a first height and is generally parallel to the bottom surface of the upper portion 15. The second sub-surface 13B extends from the inner surface of the second leg 14B at a second height, closer to the bottom of the slider than the first height and is generally parallel to the bottom surface of the upper portion 15. The third sub-surface 13C connects the first and second sub surfaces 13A and 13B. The third sub-surface 13C is generally perpendicular to the first and second sub-surfaces 13A and 13B as well as the top and bottom 17 and 15 surfaces of the upper portion 16. As seen in FIGS. 3-5, in this embodiment, the slider 1 is installed on the support member 8 by first rotating the slider 1 along the y-axis, or transverse axis. Moving to FIG. 4, the slider 1 is placed onto the support member 8 by first inserting a first flange 7A into the first section of the lower sub-cavity 19B as seen in FIG. 4. As seen in FIG. 5, the slider 1 is then rotated about the y-axis, or transverse axis such that the first notch 6A engages with the first flange 7A and the second notch 6B engages with the second flange 7B. Referring to FIG. 7, once the slider 1 is in place on the support member 8, the clamp 31 and fastener 30 may be applied to secure the module 35 on the support member 8.

Figure 9:
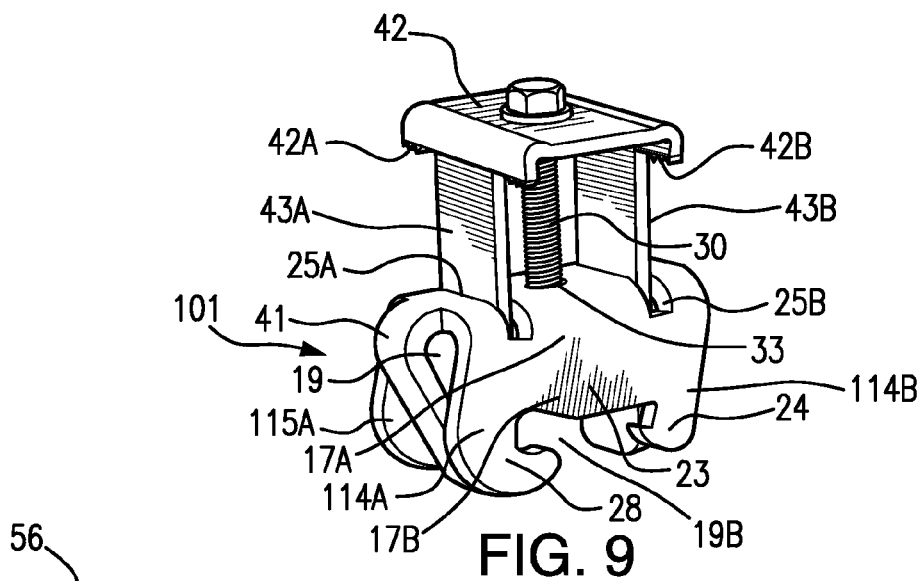
FIG. 9 is a diagram of another preferred embodiment of the clamp assembly.
Figure 13:
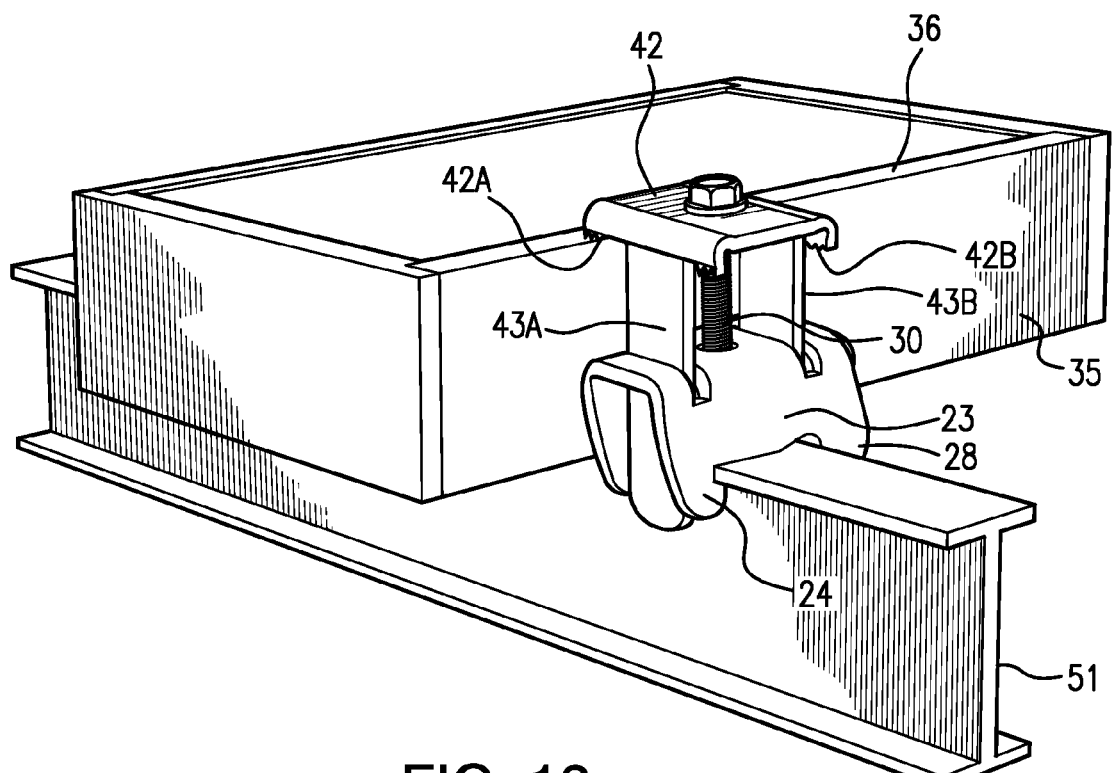
FIG. 13 is a diagram of the embodiment of FIG. 9 securing a module mounted on a support member.
Figure 15:
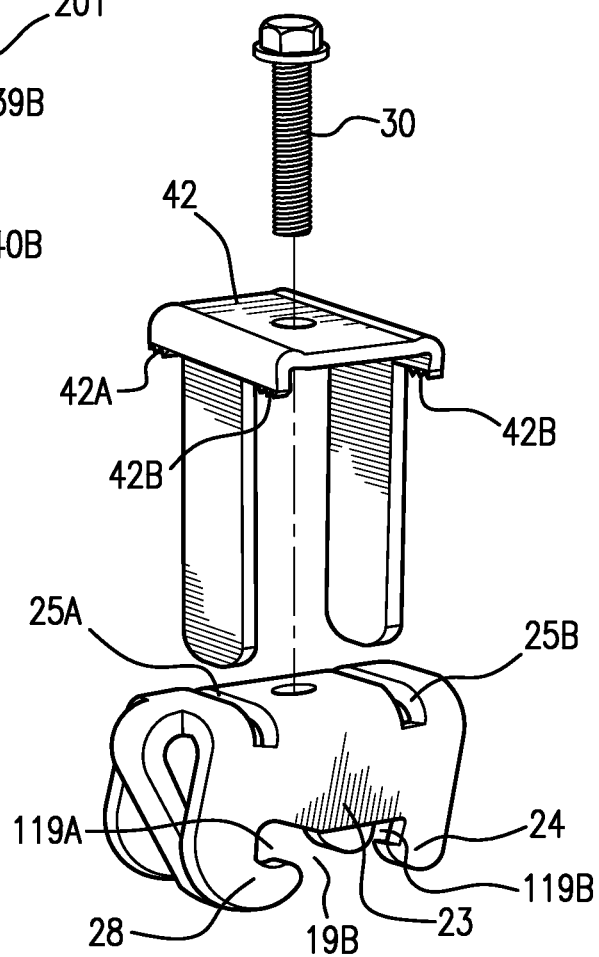
FIG. 15 is an exploded view of the embodiment of FIGS. 9 and 13.

Referring to FIGS. 9, 13 and 15, in yet another embodiment, the upper portion 17A of the slider 101 includes at least two slots 25A and 25B extending from the top surface through the bottom surface of upper portion 17A. In a preferred embodiment, the slots 25A and 25B are disposed diametrically and the hole 33 for receiving the fastener 30 located between the slots 25A and 25B. The slots 25A and 25B, are generally rectangular in shape and extend longitudinally along the length of the slider 101 and are designed to receive arms 43A and 43B of the clamp. In this embodiment, the cavity 19 extends transversely through the first leg 114A and second leg 114B to define four leg portions as well as a first face 23 and a second face opposing first face 23, each face having an outer surface and an inner surface. In this embodiment, the first face 23 includes the first leg portion 114A of the first leg and the first leg portion of the second leg 114B. The second face includes the second leg portion 115A of the first leg and the second leg portion of the second leg.

In this embodiment, the first face 23, the first leg portion of the first leg 114A and the first leg portion of the second leg 114B define the first lower sub-cavity 19B. The second face, the second portion of the first leg 115A and the second leg portion of the second leg define the second lower sub-cavity. Each leg portion includes a notch 24, 28 extending inward and designed to engage the undersurface of a flange of the support member 8. The first portion of the lower sub-cavity 119A is defined by the first and second faces 23, the first leg 114A, 115A and the notch of the first leg 28. The second portion of the lower sub-cavities 119B is defined by the first and second faces 23, the second leg 114B, 115B and the notch of the second leg 24. The first portion of the lower sub-cavity 119A has an area greater than the area of the second portion of the lower sub-cavity 119B. Additionally the notches 28, 28B of the first leg 114A, 115A have a greater surface area than the notches 24A, 24B of the second leg 114B, 115B. In this embodiment, the slider 101 may be cammed onto the support member 8 in the same manner as previously described with respect to FIGS. 3-5. Further, as seen in FIGS. 13 and 15, in this embodiment, once the slider 101 is cammed onto the support member 8, the first and second arms 43A and 43B of the clamp are inserted through the slots 25A and 25B, and the fastener 30 is inserted through the clamp and the hole in the upper portion 17A of the slider 101. In this embodiment, once the clamp arms 43A and 43B are inserted into the slots 25A and 25B, the clamp assembly is not removable from the support member 8 until the clamp arms 43A and 43B are removed from the slider 101. In this embodiment, a keeper member 41 extends downward from a first longitudinal side of the upper portion 17A. The keeper member 41 is designed to keep the slider 101 centered on the support member 8.

Figure 8:
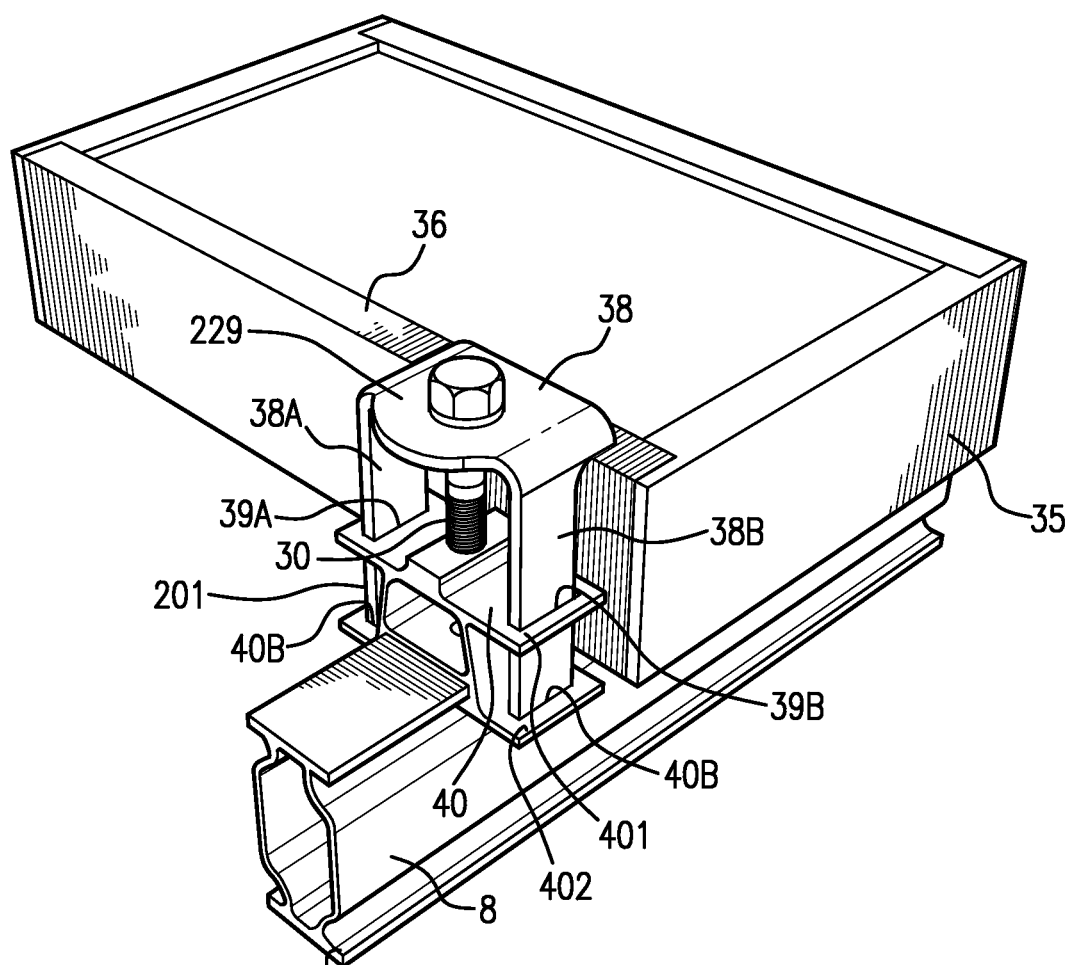
FIG. 8 is a diagram of another embodiment of the clamp assembly securing a module mounted on a support member.
Figure 14:
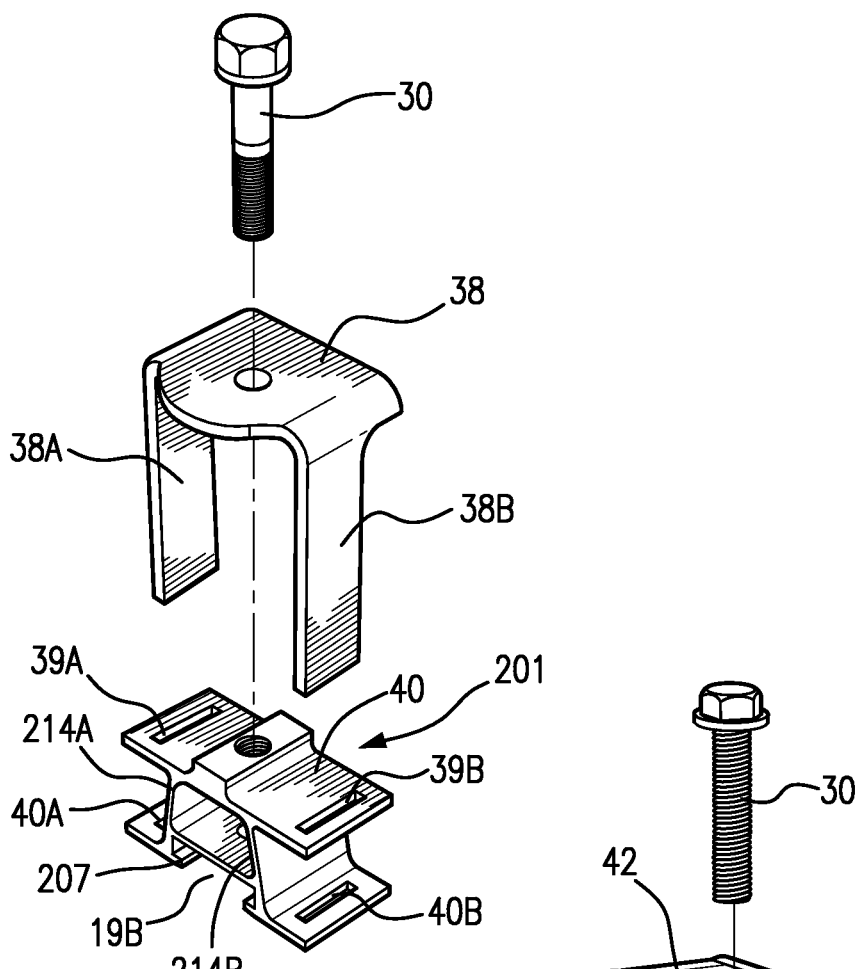
FIG. 14 is an exploded view of the embodiment of FIG. 8.

Referring now to FIGS. 8 and 14, in another embodiment, the slider 201 further includes at least one upper wing portion 401 extending transversely away from the upper portion 40 of the slider 201 and at least one lower wing portion 402 extending transversely away from the bottom portion of each leg 214. The wings 401 and 402 are generally planar and define a top surface and a bottom surface. The wing portions each have a slot 39A, 39B, 40A, 40B extending through the wing from the top surface through the bottom surface and sized to accept the arms 38A, 38B of a clamp 38. In a preferred embodiment, the slots are rectangular in shape, the major side of the rectangle hole extending longitudinally along the slider 201, and the minor side extending along the transverse axis of the slider 201. In this embodiment, lower wings 402 each include a notch 207 extending inwardly to engage with the underside of a flange on the support member 8 and secure the slider 201 to the rail. In this embodiment, the notches 207 in the two lower wings, the inner surfaces of the legs 124A and 214B and the bottom surface of a web portion define a lower subcavity 19B sized to receive a flange of the support member.

The fastener 30 provides variable clamp height. As seen in FIG. 6, the fastener 30 comprises a body defining a threaded portion 30A and a top portion 30B. The fastener 30 is disposed in the threaded hole of the slider as well as the hole in the clamp as seen in FIG. 7. When the slider 1 is in place on the rail and a module 35 is placed proximate to the slider, the fastener 30 is inserted through the hole in the clamp 31 to secure the clamp 31 to the module 35. When the fastener 30 is tightened, the clamp assembly secures the module in place on the support member 8.

The clamp may be made of any suitable material or combination of suitable materials, for example, inserts for conduction, but is preferably made of stainless steel. Other preferred materials include Nickel, titanium, aluminum, tungsten and silver. The clamp 31 as seen in FIG. 1, includes a plate 29 having a top surface and a bottom surface. The top and bottom surfaces of the plate 29 are generally planar. The plate 29 generally has four sides, two sides extending along the longitudinal axis, and two sides extending along the transverse axis. In one embodiment, longitudinal sides of the plate 29 are curved downward. In another embodiment for example in FIGS. 10-12, the plate is generally rectangular in shape. In another embodiment, for example in FIGS. 8 and 14, one of the transverse sides of the plate 229 is generally curved. In a preferred embodiment, the plate includes a hole 33 defining a channel extending through the plate from the top surface to the bottom surface. The hole is designed to receive a fastener 30 for fastening the clamp to the slider. In a particularly preferred embodiment, the hole 30 is located at the center of the plate 29.

Referring to FIG. 8, in one embodiment, the clamp 38 includes at least one arm 38A or 38B extending downward from a longitudinal side of the plate 29. In a preferred embodiment, the clamp 38 includes at least two arms 38A and 38B extending downward from the two longitudinal sides of the plate 29 toward the slider 40. When the clamp 38 engages the slider 40, the arms 38A and 38 are inserted into corresponding slots 39A, 39B, 40A, 40B on the slider 40. When engaged with the slots 39A, 39B, 40A, 40B in the slider 40, the arms 38A and 38B prevent the clamp assembly from rotating or tilting along the y-axis. They also allow the clamp assembly to be used both as a mid clamp, placed between two modules, and an end clamp, placed next to only one module. Unlike the prior art which required separate mid-clamps and end-clamps, the clamp assembly of the present embodiment may be used as both a mid clamp and an end clamp.

Referring to FIG. 7, in use, the fastener 30 is inserted through the clamp 31 and the slider 1. A module 35 sits on an upper surface of a rail 8 such that the bottom surface of the module rests on the top surface of the rail 8. The slider 1 is cammed, slid or snapped onto the rail proximate to the module 35. The clamp 31 is placed on the top surface of the module 35 above the slider and connected to the slider with a fastener 30 inserted through the clamp 31 and threaded through the slider 1. In this way when the fastener 30 is tightened, the clamp assembly sandwiches the module 35 between the plate 29 and the support 8.

Universal clamps are designed to provide integrated bonding across modules in addition to securing modules to support members. Integrated bonding is achieved through sharp portions, or "fangs" 42 that are designed into the end(s) of the clamp that will pierce a nonconductive coating, such as annodization, and become embedded into the conductive base substrate, such as aluminum. An example of where and how the clamp provides bonding is with adjacent PV modules where the module frames are manufactured from aluminum and the aluminum is protected with an anodized coating. Referring to FIG. 7, the plate 29 stainless steel module mid clamp has fangs 42 extending in a downward direction. The fangs 42 are of sufficient sharpness such that when the fastener is tightened, the fangs 42 pierce through the annodization into the aluminum substrate of the module frame 32 and provide a path of continuity between adjacent modules. The fangs 42 additionally provide resistance to lateral loads on modules.

Figures 10, 11:
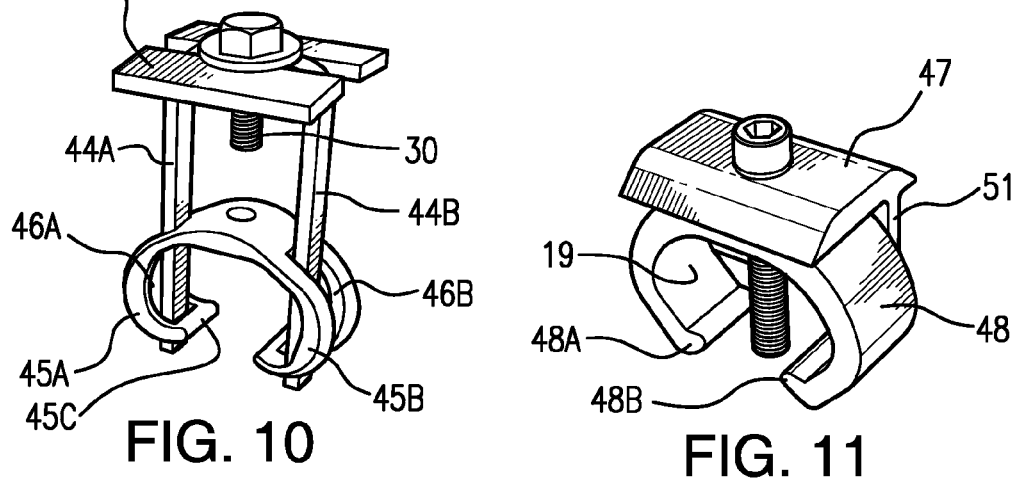
FIGS. 10-12 depict diagrams of alternative embodiments of the clamp assembly.

Various other embodiments of the slider and clamp are contemplated, for example, with respect to FIG. 10, the slider includes an upper portion and a lower portion having at least four legs 45A, 45B, 46A, 46B. The first two legs, 45A and 46A are separated by a slot and extend from a first side of the upper portion. The second two legs, 45B and 46B are separated by a slot and extend from a second side of the upper portion. The first two legs 45A and 46A on the first side are connected at the bottom of the slider by a notch connector 45C extending longitudinally along the slider. The second two legs 45B and 46B on the second side are connected at the bottom of the slider by a notch connector extending longitudinally along the slider. The notch connector 45C is designed to engage with the underside of a flange 7A, 7B of a support member 8. The slots are designed to receive arm members 44A, 44B of the clamp portion. As seen in FIGS. 11 and 12, slider 48, 49 may be a unitary piece comprising a single cavity 19, with notches 48A, 48B, 50A, 50B adapted to engage with the underside of a support member 8. The clamp 47 may include a single arm 51 extending downward from the plate. Additionally, each clamp assembly may include multiple fasteners 30 as seen in FIG. 12.

It is to be understood that while the invention has been described in conjunction with the various illustrative embodiments, the forgoing description is intended to illustrate and not limit the scope of the invention, which is defined by the scope of the appended claims. For example, a variety of systems and/or methods may be implemented based on the disclosure and still fall within the scope of the invention. Other aspects, advantages, and modifications are within the scope of the following claims.

We claim:

1. A clamp assembly for securing a module to a support member, the clamp assembly comprising:
    a slider, a clamp, and a fastener, wherein,
    the slider is adapted to be placed on the support member to secure the module to the support member, and the slider includes an upper portion having at least one hole for receiving the fastener, and a lower portion having at least one leg, wherein the upper portion and the at least one leg defines at least one cavity extending longitudinally along the slider to receive at least one flange of the support member;

the clamp includes a plate portion having at least one hole for receiving the fastener;

the fastener is adapted to be inserted through the at least one hole in the clamp and the at least one hole in the slider to secure the module to the support member;

wherein the slider further comprises a web portion extending from a first leg of the slider transversely through the at least one cavity to a second leg of the slider, the web portion dividing the at least one cavity into an upper sub-cavity and a lower sub-cavity, and wherein the lower sub-cavity is configured to cam onto the support member to secure the clamp assembly to the at least one flange of the support member.

2. The clamp assembly of claim 1, wherein the clamp includes at least one sharp portion extending downward from the plate portion, wherein the sharp portion is of sufficient sharpness configured to pierce an anodized module frame.

3. The clamp assembly of claim 1, wherein the clamp includes at least two sharp portions extending downward from the plate portion, and wherein the sharp portions are of sufficient sharpness configured to pierce an anodized module frame.

4. A clamp assembly for securing a module to a support member, the clamp assembly comprising:

a slider, a clamp, and a fastener, wherein, the slider is adapted to be placed on the support member to secure the module to the support member, and the slider includes an upper portion having at least one hole for receiving the fastener, and a lower portion having at least one leg, wherein the upper portion and the at least one leg defines at least one cavity extending longitudinally along the slider to receive at least one flange of the support member;

the clamp includes a plate portion having at least one hole for receiving the fastener;

the fastener is adapted to be inserted through the at least one hole in the clamp and the at least one hole in the slider to secure the module to the support member;

wherein the clamp further includes at least one arm extending downward from at least one side of the plate portion; and wherein the slider further includes at least one slot extending longitudinally along the slider, and configured to accept the at least one arm of the clamp.

5. The clamp assembly of claim 4, wherein the clamp includes at least two arms extending downward from at least two sides of the plate portion.

6. A clamp assembly for securing a module to a support member, the clamp assembly comprising:

a slider, a clamp, and a fastener, wherein, the slider is adapted to be placed on the support member to secure the module to the support member, and the slider includes an upper portion having at least one hole for receiving the fastener, and a lower portion having at least one leg, wherein the upper portion and the at least one leg defines at least one cavity extending longitudinally along the slider to receive at least one flange of the support member;

the clamp includes a plate portion having at least one hole for receiving the fastener;

the fastener is adapted to be inserted through the at least one hole in the clamp and the at least one hole in the slider to secure the module to the support member;

wherein the clamp includes at least two arms extending downward from at least two sides of the plate portion;

and wherein the slider further includes at least two slots extending longitudinally along the slider, and configured to accept the at least two arms of the clamp.

7. The clamp assembly of claim 6, wherein the clamp includes at least two sharp portions extending downward from the plate portion, and wherein the sharp portions are of sufficient sharpness configured to pierce an anodized module frame.

8. The clamp assembly of claim 6, wherein the slider further includes a keeper member extending from the upper portion of the slider, the keeper portion configured to maintain the slider centered on the support member.

9. The clamp assembly of claim 6, wherein the slider further includes at least two wing portions extending diametrically outward from the upper portion of the slider, and two wing portions extending diametrically outward from the lower portion of the slider, and wherein each wing portion includes a slot.

10. The clamp assembly of claim 9, wherein the slots are sized to secure the arms within the slots and prevent the arms from rotating when the arms are disposed within the slots.

11. The clamp assembly of claim 6, wherein the fastener is disposed through the at least one hole in the clamp and threaded through the at least one hole in the slider and a distance between the clamp and the slider is adjustable to allow the clamp to fasten modules of varying heights to the support member.

* * * * *